Fig.1.

Inventors:
Oscar Kleinschmit
and Karl Kugler
Attorney.

Dec. 4, 1934.   O. KLEINSCHMIT ET AL   1,982,743
WIRE STITCHING OR STAPLING MACHINE
Filed March 1, 1933   6 Sheets-Sheet 2

Inventors:
Oscar Kleinschmit
and Karl Kugler
By
Attorney.

Dec. 4, 1934.  O. KLEINSCHMIT ET AL  1,982,743
WIRE STITCHING OR STAPLING MACHINE
Filed March 1, 1933   6 Sheets-Sheet 5

INVENTORS
Oscar Kleinschmit
and  Karl Kugler
By Emil Bönnelycke
ATTORNEY

Patented Dec. 4, 1934

1,982,743

UNITED STATES PATENT OFFICE 1,982,743

WIRE STITCHING OR STAPLING MACHINE

Oscar Kleinschmit and Karl Kugler, Leipzig-Plagwitz, Germany, assignor to Gebruder Brehmer, Leipzig-Plagwitz, Germany, a German firm Application March 1, 1933, Serial No. 659,214
In Germany March 1, 1932

23 Claims. (Cl. 1—2)

The present invention relates to wire switching or stapling machines and has for its object to provide in such machines improved staple forming and driving mechanism adapted to be adjusted in situ to produce staples of various widths which subsequently are driven into the work to be stitched.

Staples of comparatively narrow width are successfully used in many types of work and a saving of stitching wire is thus effected but when narrow staples are used the clinched ends of the shanks thereof are correspondingly short and in some cases do not provide a good hold upon the outer leaves of books or the like so stitched. Similar disadvantages of narrow staples are experienced, for example, in the stitching of cardboard boxes formed of corrugated cardboard in which case wide staples providing correspondingly long clinched ends of the shanks are desirable to increase the strength of the box. On the other hand narrow staples are satisfactory for use with smooth, firmly pressed paper.

For practical purposes the adjustment of the stapling mechanism in situ for varying the width of the staples has hitherto been impossible particularly in wire stitching machines in which provision is made for varying the length of the staple shanks. In known wire stitching machines of simple construction, staples of various widths and having shanks of various lengths can be produced by the substitution of staple forming and driving parts of different sizes in the stitching head. Such substitution of the working parts occupies considerable time and the substituted parts need very careful adjustment.

According to this invention the staple forming and driving members are formed in two corresponding oppositely disposed groups adapted to be displaced relatively to each other so that the oppositely disposed groups become equally displaced from a common centre or alternatively one group becomes displaced relatively to the fixed position of the other group.

Such relative displacement of the staple or stitch forming mechanism may be accomplished by means of widely varied mechanism, for example, by providing the oppositely disposed members to be displaced with oppositely inclined grooves or faces adapted to be engaged by wedges of corresponding inclination which, when moved, cause the requisite displacement about a central setting of the staple forming members referred to. In the place of the displacing wedges use may be made of screw threaded members or a combination of both. If desired the oppositely disposed groups of staple handling parts could be spring loaded and thus forced apart when permitted to do so by a threaded or similar retaining member.

Alternatively the displacement could be achieved by means of pivotal link arrangements and the said displacing movements may be performed by mechanism which is operatively connected to the wire feed adjusting device which functions in accordance with the thickness of the work to be stitched as hereinafter referred to and described.

In order that the invention may clearly be understood two constructional embodiments of stapling mechanism constructed in accordance therewith will now be described with reference to the accompanying drawings in which.

The constructional forms of the invention, as hereinafter to be described, are applied to a wire-stitching or stapling head of common type in which, in known manner, the wire is fed to a wire head and then into a bending block with which are associated reciprocatory bending plungers and staple driving members. The bending plungers first move downwards and shape the straight piece of wire, now severed from the supply, into the shape of an inverted U over the bending block. The wire-clamp thus formed is then engaged by the driving member or members and the bending block is displaced from the path of movement of the wire clamp which thereupon may be engaged by a staple supporting member adapted subsequently to retreat from the path of the staple or clamp as the latter is driven into the work by the driving member or members.

To carry the present invention into effect the wire shaping or bending block, the bending plungers and staple driving members are divided to provide, in each case, a pair of oppositely disposed members arranged to be relatively displaceable.

Figure 4:
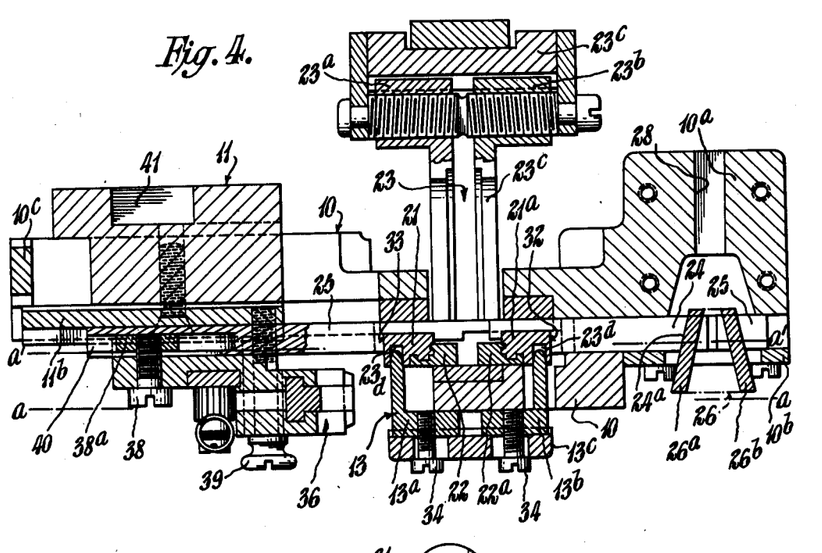
Fig. 4 is a sectional plan view taken substantially on line IV—IV of Fig. 1.
Figure 5:
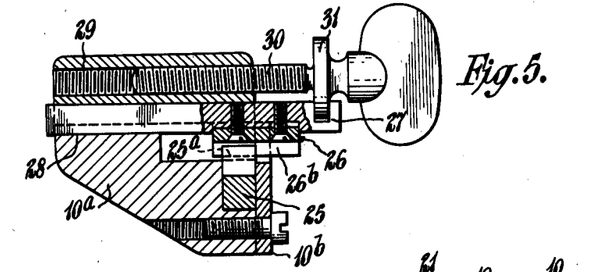
Fig. 5 shows a sectional detail view of the apparatus taken on line V—V (Fig. 1)
Figures 11, 12:
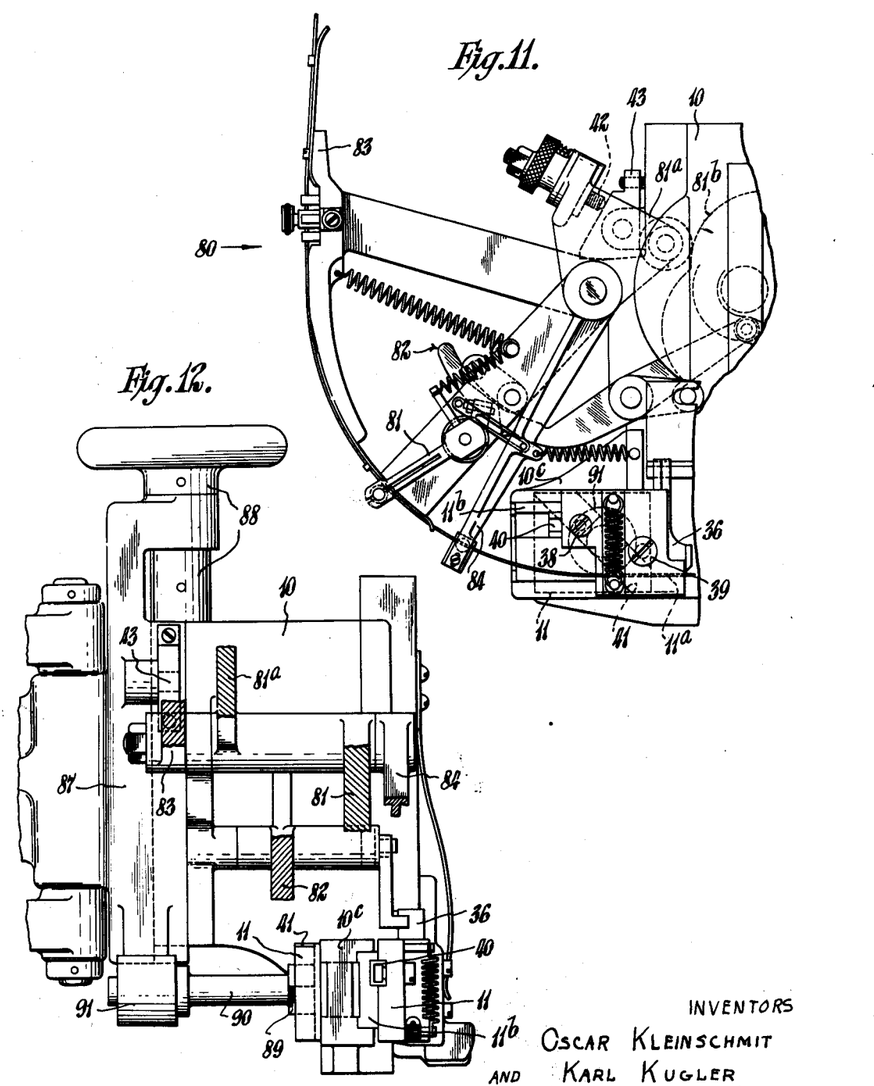
Fig. 11 is a fragmentary view showing the arrangement of the adjustable wire feed device associated with the stapling head.
Fig. 12 is a view looking in the direction of the arrow 80 (Fig. 11).

Referring to the constructional embodiment of the invention shown in Figs. 1 to 6, 11 and 12 of the accompanying drawings it will be seen that the wire stapling head includes a housing 10 which is adapted to receive and/or support the operative members of the head. The stapling head is arranged in known manner to be vertically adjusted according to the thickness of the work to be stitched and to this end the housing 10, as shown more particularly in Fig. 12, is slidably mounted in a stationary guide bracket 87, vertical displacement of the housing being effected by means of a manually operable screw adjustment indicated by the reference numeral 88. The details of the head adjustment are well known to those skilled in the art and need not be described herein to greater length. The wire which is to form the staples or clamps is fed, in known manner, from a source of supply (not shown) and passes into the substantially horizontal passage 11a provided therefor in the wire head 11, which latter is supported upon the housing of the stapling head in a manner hereinafter described. As shown more particularly in Fig. 11, the feed of the wire to the wire head 11 is achieved by a mechanism which includes a cam-actuated pivotal gripper member 81 which is pivoted upon a bracket secured to the housing 10. The engagement of the gripper member 81 with the wire is controlled through a cam-actuated trip device 82 so that in each downward arcuate movement of the gripper member 81 wire is fed from the source of supply to and through the passage 11a in the wire head 11. A stationary wire guide 83 and a movable wire support 84 are associated with the gripper member 81 in known manner. The feed stroke of the gripper 81 is limited through the medium of a set screw 42 secured to an extension 81a of the gripper 81 and which impinges upon a stationary block 43 to limit the movement of the gripper in response to the rotation of its actuating cam 81b. The block 43 is secured to the stationary housing guide bracket 87 and is formed with the contact face thereof inclined to the vertical. In the vertical displacement of the housing 10 and stapling head, according to the thickness of the work to be stitched, the set screw 42 moves relatively to the inclined face of the block 43 thus to vary the stroke of the gripper 81 and length of wire fed to the wire head 11. The wire bending block 13, which also forms part of the known arrangement, is pivoted at 13d (Figs. 2 and 3) and arranged normally to lie with its wire receiving jaws 13e in the plane a—a as shown in Fig. 4 thus to receive the length of wire fed thereto through the wire cutter 36 of the head. The latter is now actuated to sever from the wire supply the wire length W' now resting in the jaws 13e of the bending block 13 and the latter is permitted or urged to swing forward thus to advance the severed wire length W' into the operative plane a'—a' indicated in Fig. 4, as shown more particularly in Fig. 2.

Figure 1:
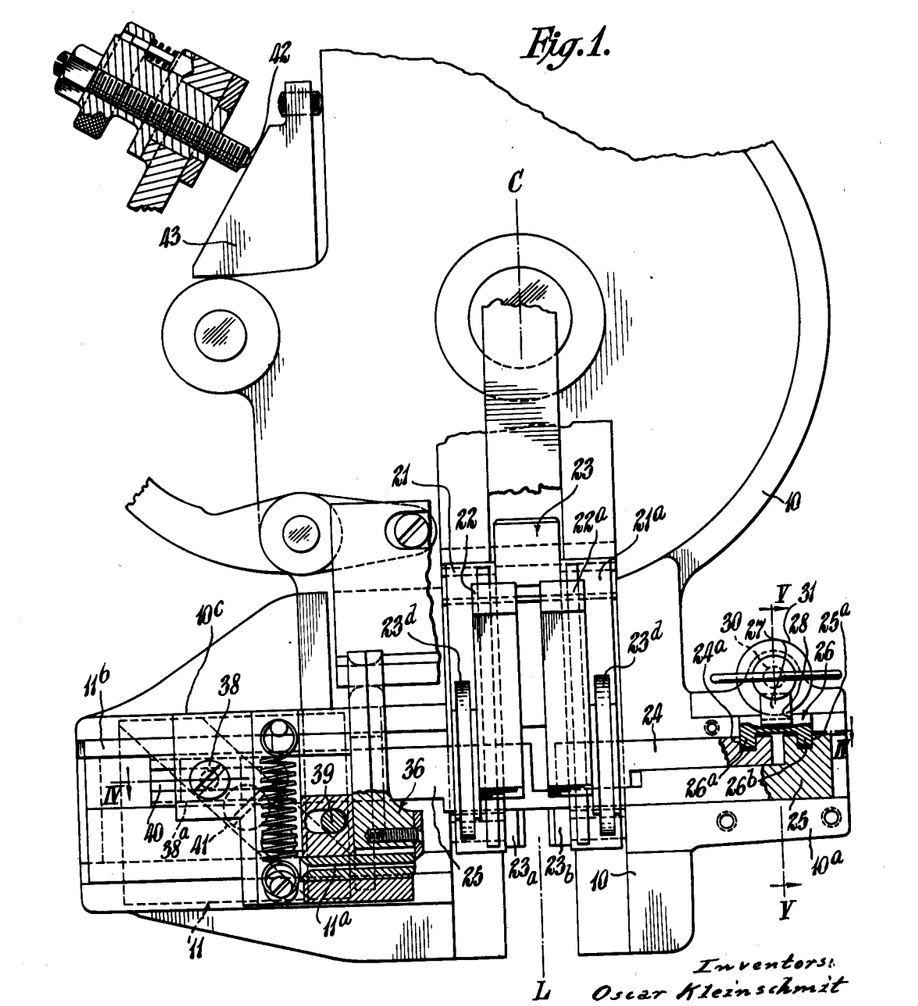
Fig. 1 is a part sectional front elevation of a known type of stapling head for wire stitching machines or the like modified according to the present invention.
Figures 2, 3, 10:
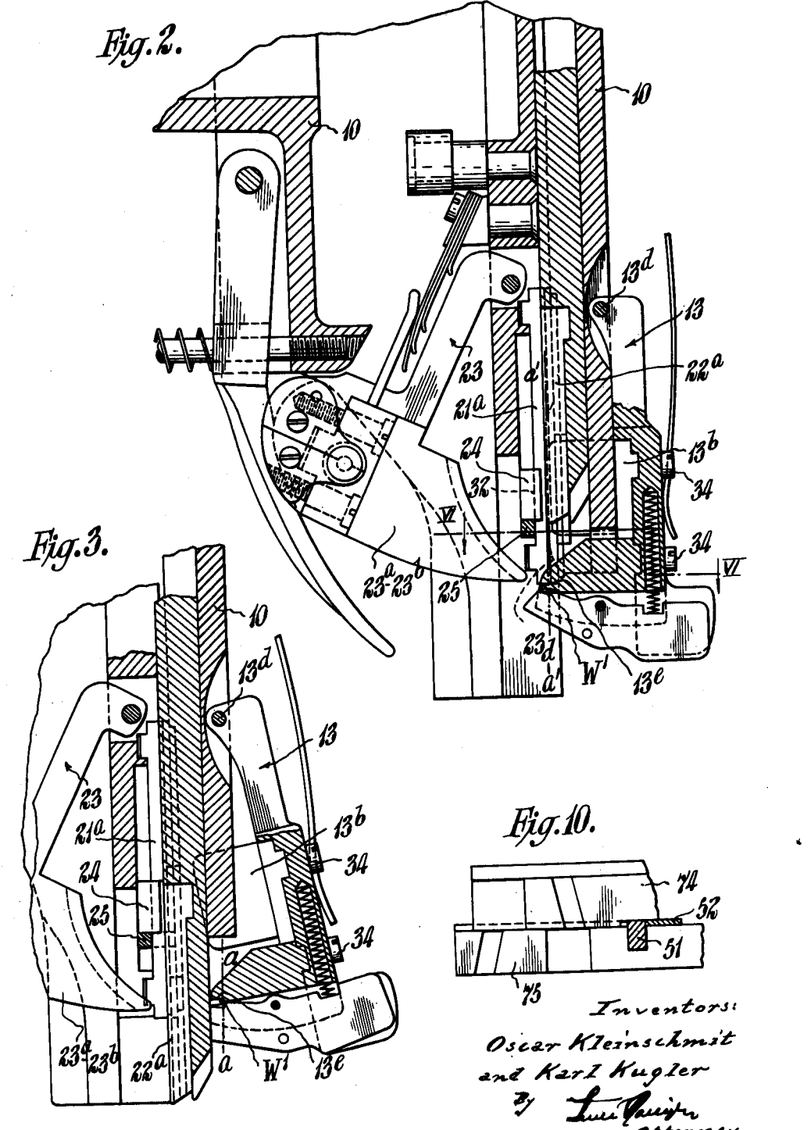
Fig. 2 is a part sectional side elevation of the arrangement shown in Fig. 1.
Fig. 3 is a fragmentary view similar to Fig. 2 but showing the wire bending block in the wire receiving position.
Fig. 10 is a fragmentary detail view of the mechanism comprising the second embodiment of the invention.

The wire bending plungers 21, 21a and staple driving members 22, 22a within the housing 10 are arranged to operate with a reciprocatory up and down movement in the plane a'—a' and are constructed in a manner hereinafter described. The wire bending plungers first move downwards to bend the wire length W' into the shape of an inverted U over the bending block 13 to form the staple or clamp and then the driving members 22, 22a descend to drive the staple or clamp downwards into the work, while at the same time the bending block 13 is displaced outwards about its pivot 13a and thus away from the operative plane a'—a'. During the downward driven movement of the clamp or staple it becomes lodged upon the yieldable support 23 which is pivotally attached to the housing 10 and suitably arranged steadily to retreat from the path of the staple as the latter is forced into the material to be stitched. Thus the bight of the staple or clamp is supported to prevent its inward buckling during insertion in the work.

The adjustments of the staple width is achieved as follows:

The bending members and driving members are carried by substantially horizontal slide plates 24, 25 which extend transversely of the housing 10 and are adapted to perform relative displacing movement. The plates are suitably recessed to form mutual bearing surfaces and extend at each extremity beyond the housing 10. The extremities of the slide plates at the right hand side of the housing 10, as viewed in Figs. 1 and 4, are slidably housed in a recess formed in a shoulder 10a of the housing 10 and a bearing plate 10b is provided to guide and hold the slide plates in the recess. At the same end, the plates 24, 25 are provided with transverse slots 24a, 25a respectively which are formed in the upper edges of the plates and lie at an inclination to the plane a'—a' as shown in Fig. 4. A wedge-shaped slide plate 26 is provided with downwardly extending ribs or slides 26a, 26b which are set at angles of inclination corresponding to those of the slots 24a, 25a so as to enter and freely slide in the latter (Figs. 1 and 4). As clearly shown in Fig. 5, the slide plate 26 is secured by screws to a slide rod or bar 27 which is adapted freely to slide in a guide slot 28 formed in the shoulder 10a at right-angles to the direction of movement of the slide plates 24, 25. The slot 28 is countersunk to provide clearance for the wedge-shaped slide plate 26 and immediately above the guide slot 28 and parallel thereto a hole 29 is drilled and tapped to receive the threaded shank of a thumbscrew 30 which is provided with an annular flange or collar 31, the latter being adapted rotatably to engage in a suitable recess or slot formed in the upper surface of the outer extremity of the slide rod 27. Thus in turning the thumbscrew 30 movement is imparted to the slide rod and wedge plate 26 so that the ribs 26a, 26b engaging the slots 24a, 25a respectively are traversed in the latter and thus cause mutual transverse displacing movement of the plates 24, 25.

The plates 24, 25 are formed intermediate their lengths with vertical guide slots 32, 33 respectively (Fig. 4), the slot 32 of the slide plate 24 serving to receive the staple bending plunger 21a while the slot 33 of the slide plate 25 receives the corresponding bending plunger 21. The front and inner opposed faces of the bending plungers 21, 21a are suitably shaped to form vertical tongues or runners which enter corresponding slots provided in the staple driving members 22, 22a which latter in this manner are slidably supported by the bending members 21, 21a. It will be appreciated that, by the means above described, the bending plungers and driving members, in the transverse movements of the slide plates 24, 25, will simultaneously be displaced and providing the slots 24a, 25a are of equal and opposite inclinations the members referred to will be displaced by equal amounts to either side of the vertical centre line CL of the stapling head.

Figure 6:
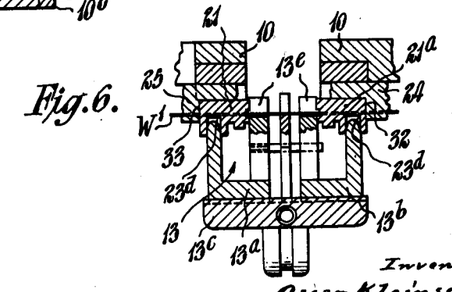
Fig. 6 shows a sectional detail view taken on line VI—VI (Fig. 2)
Figures 7, 8:
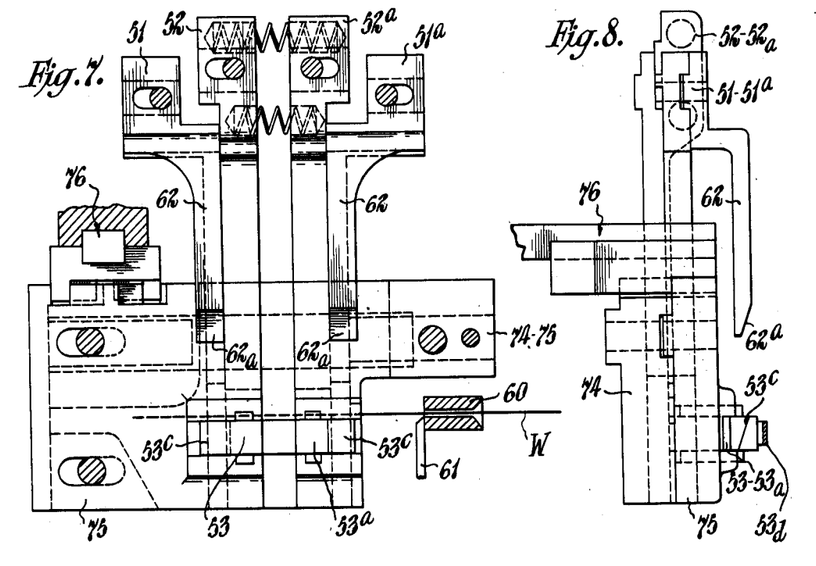
Fig. 7 is a part sectional schematic view of an alternative arrangement of the adjustable stapling mechanism according to the present invention.
Fig. 8 is a side elevational view of the arrangement shown in Fig. 7.
Figure 9:
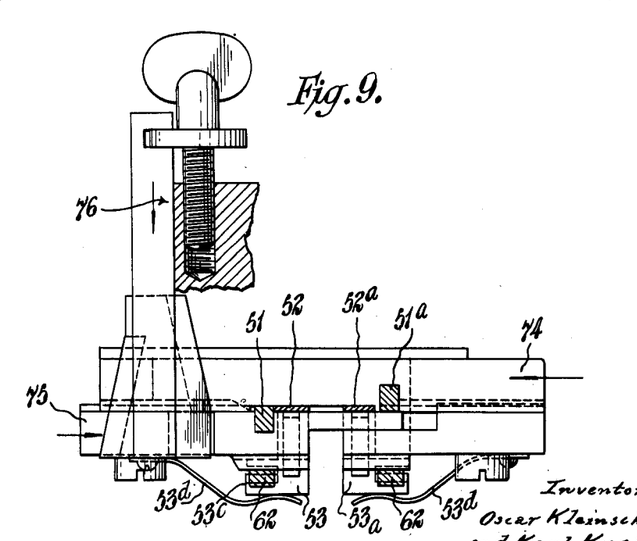
Fig. 9 is a part sectional plan view thereof.

The bending block 13 is also formed of two parts 13a, 13b which are secured to a backing plate 13c by means of set screws 34 which pass through clearance slots in the backing plate and engage suitably tapped holes in the members 13a, 13b. The latter each include an L-shaped piece, one vertical flange of which extends outward and the shaping block 13 or some portion of it thus is U-shaped in cross section. The shaping or bending plungers 21, 21a are also provided on the outer faces with vertical slots 23d which receive the free edges of the outwardly projecting flanges of the L-shaped pieces 13a, 13b when the bending block 13 is in the wire bending position (Figs. 2, 4 and 6). The effective width of the bending block 13 is thus adjustable, and such adjustment is automatically achieved in the setting of the bending plungers and driving members. To this end, prior to adjustment of the last mentioned members, the bending block 13 is moved into the wire bending position so that the flanges of the members 13a, 13b enter the slots 23d and thereupon the set screws 34 are loosened manually. In the adjustment of the bending plungers and driving members the bending block pieces 13a and 13b are moved therewith and relative to the stationary backing plate 13c. When the requisite adjustment has been effected by rotation of the thumbscrew 30, the set screws 34 are tightened to secure the pieces 13a, 13b to the backing plate 13c and thus the width of the bending block 13 is determined by adjustment of the thumbscrew 30 and strictly in accordance with the setting of the members 21, 21a and 22, 22a.

In the present embodiment means have been provided for separately adjusting also the width of the swinging staple support 23. Such adjustment, which of course is not essential although desirable, is effected in the present embodiment by forming the staple supporting member 23 in two halves 23a, 23b which are adjustably secured to a pivotal holding clamp 23c (Fig. 2). As clearly shown in Fig. 4, the two halves 23a, 23b of the staple supporting member 23 are provided with bosses drilled and tapped with left and right hand threads respectively. The staple supporting halves 23a, 23b are mounted upon a spindle suitably threaded to engage the threaded bosses and rotatably supported at either end in the holding clamp 23c. Means for rotating the spindle are provided and by reason of the opposite inclination of the threads thereon the halves 23a, 23b of the staple support are moved towards or away from each other as desired. Set screws are provided to retain the halves of the support in the position desired. The adjustment of the supporting member 23 could, if desired, be automatically achieved during the setting of the bending and driving members, i. e., by means similar to those used for adjusting the bending block 13.

Provision also is made for adjusting the position of the wire cutter 36 of the wire head 11. To this end the left hand extremity of the lower slide plate 25 (as viewed in Fig. 4) is slidably supported by the wire head 11 which in turn is slidably mounted upon a suitable guideway formed on the upper surface of an extension 10c of the housing 10. Actually, the extremity of the slide plate 25 lies in a groove formed in the wire cutter slide 11b which is attached to the wire head as shown. The wire cutters 36 are secured to the cutter slide 11b by set screws 38, 39, the screw 38 passing through the back plate of the member 36 and engaging a threaded clamping collar 38a which is slidably held in a suitable slot formed in the plate 25 while the screw 39 passes through a slotted hole in the back plate of the cutter 36 and engages in a hole drilled and tapped in the cutter slide 11b. Thus when in operation the wire cutter 36 is rigidly attached to the slide plate 25 and wire head 11. As shown more particularly in Figs. 2, 11 and 12, the back face plate of the wire head 11 has formed therein a diagonal groove 41 lying in a vertical plane and adapted to receive a lug 89 carried by an arm or rod 90 which is rigidly held by a boss or collar 91, the latter being secured to the guide bracket 87. By reason of the engagement of the lug 89 in the diagonal groove 41, the wire head 11 and its associated cutter 36 become correspondingly displaced in the vertical movement of the housing 10 so that the length of wire severed by the cutter 36 is varied according to the vertical adjustment of the stapling head. Thus in raising the head to accommodate thicker work, the wire head 11 and cutter 36 are displaced to the left as viewed in Fig. 11 so that a greater length of wire is severed when fed to the stapling head. Moreover, by reason of the self-adjustment of the wire feed as above described, a correspondingly greater length of wire also is fed to the stapling head. Such setting of the wire head is in regard to the wire feed for staples of what may be regarded as normal width as judged by those skilled in the art and moreover to permit this setting of the wire head and wire cutter 36 the set screw 38 must be loosened since the slide plate 25, which is controlled by the thumbscrew 30, must not, and moreover cannot, partake of this adjusting movement. In the event of adjustment of the staple forming and driving members for the purpose of varying the width of the staples, obviously the position of the cutter 36 must also accordingly be adjusted to obtain the requisite wire length. For this purpose, when the adjustment of the staple forming and driving members is to be effected all that is necessary is to loosen the set screw 39 thus permitting the movement of the cutter 36 with the slide plate 25 relative to the wire head 11.

If the means for adjusting the slide plates 24, 25 are set adjacent the wire feed controls 42, 43 synchronous or associated action may be established between these members to effect their respective functions under one control.

Figs. 7 to 10 show an alternative arrangement of a wire stapling head lacking the swinging staple-supporting means described in the first described embodiment but modified to carry into effect the method of this invention.

The operative components of the stapling head are divided where necessary into oppositely disposed halves, i. e., left and right hand members, which comprise a pair of wire bending members 51, 51a and associated driving members 52, 52a. The wire is fed through a wire head 60 to a position immediately above the bending block which also comprises oppositely disposed halves 53, 53a and the requisite length of wire is severed by a vertically movable cutter knife 61. The cutter knife may be adjusted by means not shown according to the thickness of the material to be stitched but normally the cutter is set to sever a length of wire requisite for forming a staple or clamp for insertion into comparatively thin material. In this case the adjustment of the width of a staple formed from a given length of wire may be utilized to increase the length of the staple shanks by narrowing the bight thereof or vice versa thus to accommodate the staples to work of slightly varied thickness.

As in the first described embodiment the bending plungers 51, 51a and driving members 52, 52a which are adapted to perform substantially vertical reciprocatory movements, are slidably mounted in slide plates 74, 75 which are adapted to be adjustably displaced in the horizontal plane by means of the manually operated wedge and slot arrangement 76 which is similar to the adjusting means described in the first embodiment.

In this embodiment the bending block members 53, 53a are slidably mounted in extensions of the slide plates 74, 75 so that these bending block members move with the slide plates in the horizontal displacement of the latter.

Thus the adjustment of the slide plates by the adjusting means 76 simultaneously effects the relative setting of the wire bending members, driving members and bending block members as will clearly be understood from the description of the first embodiment.

The wire bending plungers 51, 51a are adapted, in known manner, to move downwards to engage the extremities of the wire length, which thus is bent over the bending block members to form a staple or clamp of inverted U shape. The bending plungers have secured thereto downwardly projecting deflecting arms 62 which are provided with inclined faces 62a adapted to engage corresponding cam faces of lugs 53c which project outwards from the bending block members 53, 53a. In this manner the bending block members, which normally are held in operative position by blade springs 53d, are deflected away from the path of the staple and staple driving members which are also moving downwards to drive the staple into the work. The deflecting arms 62, being attached to the respective wire bending members, partake of the adjusting movements of the operative components.

From the above description it will readily be appreciated that the requisite adjustment of the operative parts of the staple head could, if desired, be carried into effect by an arrangement whereby only one of each pair of the operative members is displaced relative to the other of the pair which latter would be fixedly mounted in regard to the adjustment.

Figure 13:
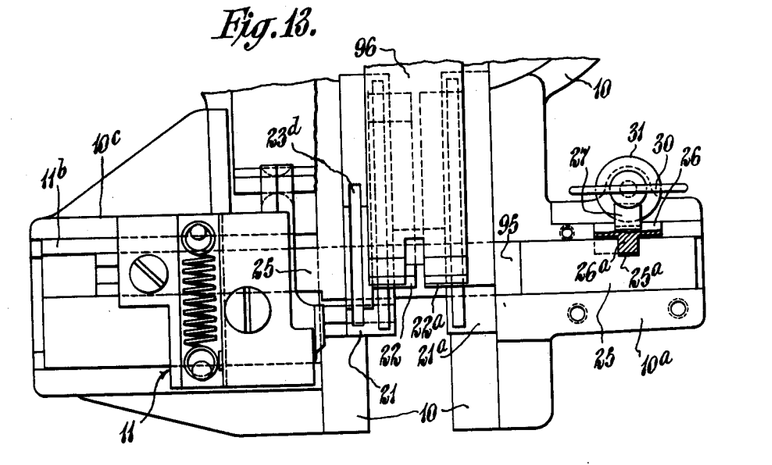
Fig. 13 shows, in part sectional elevation a modified form of an adjustable stapling head constructed according to the present invention.
Figure 14:
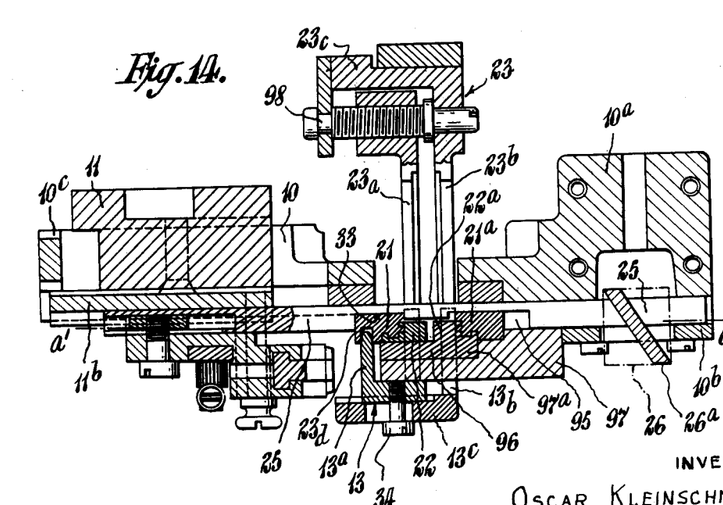
Fig. 14 is a sectional plan view thereof cut away conveniently to show the adjustable parts of the head.

Such an arrangement may be carried into effect by modifying in the manner shown in Figs. 13 and 14 the constructional embodiment above described in reference to Figs. 1–6 of the drawings. To this end the wire bending and staple driving members are arranged in oppositely disposed groups as in the previous embodiment, but the left-hand group only (as viewed in the drawings) is adjustably mounted while the right-hand group is located in a stationary setting on the housing 10.

As in the first described embodiment, the left-hand wire bending plunger 21 is slidably mounted in a vertical guide slot 33 formed intermediate the length of the substantially horizontal slide plate 25 which extends transversely of the housing 10 and is adapted to perform displacing movement relative thereto. The plate 25 extends outwardly at either extremity beyond the housing 10, the right-hand extremity thereof being slidably housed in a recess formed in the shoulder 10a of the housing 10 while a bearing plate 10b is attached to the housing to retain the slide plate 25 in the recess. In this embodiment, however, the slide plate 24 of the first embodiment is not used, the wire bending plunger 21a being slidably mounted in the housing 10 and passing through a clearance slot 95 formed in the guide plate 25. As in the first described embodiment, the right-hand extremity of the slide plate 25 is provided with a transverse slot 25a, which is formed in the upper edge of the plate and lies at an inclination to the plane a'—a'. In this case, the manually actuated adjusting means comprising the displaceable slide plate 26 is provided with only one downwardly extending rib or slide 26a which is set at an angle of inclination corresponding to that of the slot 25a so as to enter and freely slide in the latter. The arrangement of the slide plate 26 and its manipulation through the medium of the thumbscrew 30 is as described in reference to the first described embodiment.

The staple driving members 22, 22a are slidably mounted, as in the previous embodiments, upon vertical tongues or runners formed upon the appropriate faces of the plungers 21, 21a; in this case, however, the front face of the member 22a is extended to form a guide face 96 which bears against the recessed slide surface 97a formed in the outer extension 97 of the housing 10.

The bending block 13 as in the above-described embodiments comprises two parts 13a and 13b secured to the backing plate 13c. In the present instance, however, the right-hand block member 13b is fixedly positioned relatively to the bending plunger 21a and staple driving member 22a while the left-hand bending block member 13a is adjustably secured by means of the setscrew 34 to the backing plate 13c as shown in Fig. 14. As previously described, a flange of the bending block member 13a slidably engages a vertical slot 23d formed in the adjustable wire bending plunger 21 so that when the latter is adjusted the member 13a partakes of the movement, providing that the set screw is first loosened from the fixed backing plate 13c.

It will be appreciated from the above description that when the plate 26 is displaced through the medium of the thumbscrew 30 the slide plate 25 is displaced transversely of the stapling head so that the wire bending plunger 21, staple driving member 22 and bending block member 13a are displaced relatively to the set position of the corresponding members 21a, 22a and 13b, thus to vary as desired the width of the staples inserted into the work.

As in the above-described embodiment, separate means are also provided for correspondingly varying the width of the swinging staple support 23, but such adjusting means are modified in that the right-hand member 23b is, of course, fixedly mounted in relation to the corresponding stapling members and only the left-hand member is displaceable through the medium of a threaded member 98 which is rotatably mounted in the upper bridge piece 23c of the member 23 and makes threaded engagement with a threaded boss of the member 23a.

The wire head 11 and wire severing device 36 are adjustably linked to the left-hand extremity of the slide plate 25 in a manner similar to that previously described and thus take part in the adjustment of the stapling head components.

The further details of this constructional form of the stapling head may, if desired, be precisely similar to those of the first described embodiment and need not therefore again be herein described.

Moreover, it will be clear that means other than those above described may be utilized for effecting the adjustment of the requisite parts of the stapling arrangement without departing from the scope of the present invention, as defined in the appended claims.

We claim:

1. In a wire stitching or stapling machine the provision of staple forming and driving members each of which is divided, the divisions being arranged in oppositely disposed groups and adapted to be displaced relatively to each other to vary the size of the staple inserted into the work.

2. In a wire stitching or stapling machine the provision of a wire bending plunger comprising oppositely disposed parts adapted to perform relative movement, a staple driving member comprising oppositely disposed parts adapted to perform relative movement, and means for imparting relative displacing movement to said oppositely disposed parts to vary the size of the staple inserted into the work.

3. In a wire stitching or stapling machine the provision of a wire bending plunger comprising oppositely disposed parts adapted to perform relative movement, a staple driving member comprising oppositely disposed parts adapted to perform relative movement, a wire bending block comprising oppositely disposed parts adapted to perform relative movement, and means for effecting relative displacement of said oppositely disposed parts to vary the size of the staple inserted into the work.

4. In a wire stitching or stapling machine the provision of a wire bending plunger comprising at least two parts oppositely disposed at equal distances from a common centre line, a staple driving member comprising at least two parts disposed at equal distances from said centre line, and means for moving all of said parts by equal distances to and from said centre line to vary the size of the staples inserted into the work.

5. In a wire stitching or stapling machine the provision of a wire bending plunger comprising two oppositely disposed parts one of which is adapted to be displaced relatively to the fixed path of movement of the other, a movable staple driving member comprising two oppositely disposed parts one of which is adapted to be displaced relatively to the fixed path of the other, and means for effecting relative displacement of said parts to vary the size of the staple inserted into the work.

6. In a wire stitching or stapling machine the provision of a wire bending plunger comprising two oppositely disposed parts one of which is adapted to be displaced relatively to the fixed path of movement of the other, a movable staple driving member comprising two oppositely disposed parts one of which is adapted to be displaced relatively to the fixed path of movement of the other, a movable wire bending block comprising two oppositely disposed parts one of which is adapted to be displaced relatively to the fixed path of the other, and means for effecting relative displacement of said parts to vary the size of the staples inserted into the work.

7. In a wire stitching or stapling machine a stapling head which includes a pair of slide plates adapted to move in a substantially horizontal plane, a wire bending plunger comprising two oppositely disposed parts slidably mounted upon said plates, a staple driving member comprising two oppositely disposed parts supported by said slide plates slidably mounted relatively to said bending plunger parts, and means for imparting inverse movement to said slide plates in their plane of movement to vary the distance between said oppositely disposed parts of the stapling head.

8. In a wire stitching or stapling machine a stapling head which includes a pair of slide plates adapted to move in a substantially horizontal plane, a wire bending plunger comprising two oppositely disposed parts slidably mounted upon said plates, a staple driving member comprising two oppositely disposed parts slidably mounted upon said plunger parts, a wire bending block formed in oppositely disposed parts associated with said bending plunger parts and means for imparting inverse movement to said slide plates in the horizontal plane to vary the distance between said oppositely disposed parts of the stapling head.

9. In a wire stitching machine a stapling head which includes a pair of slide plates adapted to move in a substantially horizontal plane, a wire bending plunger comprising two oppositely disposed parts slidably mounted upon said plates to perform substantially vertical reciprocatory movement, a staple driving member comprising two oppositely disposed parts slidably mounted upon said plunger parts to perform substantially vertical reciprocatory movement, a wire bending block comprising two oppositely disposed members associated with said bending plunger parts, means for imparting inverse movement to said slide plates in the horizontal plane to vary the distance between said oppositely disposed parts, and a yieldable staple supporting member associated with said staple head.

10. In a wire stitching machine, a stapling head which includes a pair of slide plates adapted to move in a substantially horizontal plane, a wire bending plunger comprising two oppositely disposed parts slidably mounted upon said plates to perform a substantially vertical reciprocatory movement, a staple driving member comprising two oppositely disposed parts slidably mounted upon said plunger parts to perfrom substantially vertical reciprocatory movement, a wire bending block comprising two oppositely disposed members associated with said bending plunger parts, means for imparting inverse movement to said slide plates in the horizontal plane to vary the distance between said oppositely disposed parts, and a yieldable staple supporting member associated with said staple head and comprising two oppositely disposed parts adapted for relative displacement according to the adjustment of said staple forming and driving parts.

11. In a wire stitching or stapling machine a stapling head which includes a pair of slide plates adapted to perform inverse movement in a substantially horizontal plane and each provided with a slot, said slots being set at equal inclination in the horizontal plane to a common centre line, a plate having flanges adapted to engage said slots, means for imparting movement to said flanged plate transverse of said slide plates so that the latter perform inverse movement in the substantially horizontal plane, a wire bending member comprising two oppositely disposed parts slidably mounted upon said slide plates, a staple driving plunger comprising two oppositely disposed parts supported by said slide plates and slidably mounted relative thereto, and a wire bending block associated with said wire bending plunger parts and adapted to take part in the inverse movement of said slide plates.

12. In a wire stitching or stapling machine a stapling head which includes a pair of slide plates adapted to move in a substantially horizontal plane, a wire bending plunger comprising two oppositely disposed parts slidably mounted upon said plates, a staple driven member comprising two oppositely disposed parts slidably mounted upon said bending plunger parts, and means for imparting inverse movement to said slide plates in their plane of movement to vary the distance between said oppositely disposed parts of the stapling head.

13. In a wire stitching or stapling machine the provision of staple forming and driving members each of which is divided, the divisions being arranged in oppositely disposed groups and adapted to be displaced relatively to each other to vary the size of the staple inserted into the work, a wire cutter head associated with said staple forming and driving members, and means for adjusting said wire cutter head in accordance with the adjustment of said staple forming and driving members.

14. In a wire stitching or stapling machine the provision of a wire bending plunger comprising oppositely disposed parts adapted to perform relative movement, a staple driving member comprising oppositely disposed parts adapted to perform relative movement, means for imparting relative displacing movement to said oppositely disposed parts to vary the size of the staple mounted into the work, a wire cutter head associated with said stapling members, and means for adjusting said wire cutter head in accordance with the variation in the length of wire required for the staple.

15. In a wire stitching or stapling machine a stapling head which includes a pair of slide plates adapted to move in a substantially horizontal plane, a wire bending plunger comprising two oppositely disposed parts slidably mounted upon said plates, a staple driving member comprising two oppositely disposed parts supported by said slide plates and slidably mounted relatively to said bending plunger parts, means for imparting inverse movement to said slide plates to vary the distance between said oppositely disposed parts of the stapling head, and a wire cutter head slidably mounted adjacent said stapling head and linked to one of said slide plates so as to follow the displacing movement of the latter to vary the length of the wire according to the size of the staple to be driven.

16. In a wire stitching or stapling machine the provision of staple forming and driving members each of which is divided, the divisions being arranged in oppositely disposed groups and adapted to be displaced relatively to each other to vary the size of the staple inserted into the work, a wire cutter head associated with said staple forming and driving members, and means for automatically varying the position of said wire cutter head in accordance with the setting of said staple forming and driving members and the length of wire fed to the stapling head.

17. In a wire stitching or stapling machine the provision of a wire bending plunger comprising oppositely disposed parts adapted to perform relative movement, a staple driving member comprising oppositely disposed parts adapted to perform relative movement, a wire bending block comprising oppositely disposed parts adapted to perform relative movement, a yieldable staple supporting member, associated with said staple forming and driving parts, a wire cutter head associated with said last mentioned parts, and means for effecting by one control the requisite displacement of the members set forth according to the size of staple required.

18. Staple forming and driving means as claimed in claim 17, in which the yieldable staple supporting member comprises oppositely disposed parts, and means for effecting relative displacement of said parts in accordance with the setting of the first mentioned staple forming and driving members.

19. In a wire stitching or stapling machine a stapling head which includes a slide plate adapted to move in a substantially horizontal plane, a wire bending plunger comprising two oppositely disposed parts one of which is mounted upon said slide plate, a staple driving member comprising two oppositely disposed parts slidably mounted upon said plunger parts, and means for displacing said slide plate to vary the distance between said oppositely disposed parts of the stapling head.

20. In a wire stitching or stapling machine a stapling head which includes a slide plate adapted to move in a substantially horizontal plane, a wire bending plunger comprising two oppositely disposed parts one of which is mounted upon said slide plate, a staple driving member comprising two oppositely disposed parts slidably mounted upon said plunger parts, a wire bending block formed in oppositely disposed parts associated with said bending plunger parts, and means for displacing said slide plate to vary the distance between said oppositely disposed parts of the stapling head.

21. In a wire stitching or stapling machine a stapling head which includes a slide plate adapted to move in a substantially horizontal plane, a wire bending plunger comprising two oppositely disposed parts one of which is mounted upon said slide plate, a staple driving member comprising two oppositely disposed parts slidably mounted upon said bending plunger members to perform substantially vertical reciprocatory movement, a wire bending block comprising two oppositely disposed members associated with said bending plunger parts, means for displacing said side plate to vary the distance between said oppositely disposed members of the stapling head, and a yieldable staple supporting member associated with said stapling head.

22. A wire stitching or stapling machine as claimed in claim 21, wherein the staple supporting member comprises two oppositely disposed parts adapted for relative displacement according to the adjustment of the staple forming and driving parts.

23. In a wire stitching or stapling machine the provision of staple forming and driving members each of which is divided, the divisions being arranged in oppositely disposed groups, one group being displaceable relatively to the other to vary the size of the staple inserted into the work, a wire feed head including a wire cutter associated with said staple forming and driving members, and means for adjusting said wire feed head and cutter in accordance with the adjustment of said staple forming and driving members.

OSCAR KLEINSCHMIT.
KARL KUGLER.